US006994936B2

(12) United States Patent
Mori

(10) Patent No.: US 6,994,936 B2
(45) Date of Patent: Feb. 7, 2006

(54) NONAQUEOUS ELECTROLYTE SECONDARY BATTERY

(75) Inventor: Sumio Mori, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 450 days.

(21) Appl. No.: 10/284,237

(22) Filed: Oct. 31, 2002

(65) Prior Publication Data

US 2003/0118914 A1 Jun. 26, 2003

(30) Foreign Application Priority Data

Nov. 1, 2001 (JP) ............................ 2001-337212

(51) Int. Cl.
*H01M 10/40* (2006.01)
*H01M 4/58* (2006.01)

(52) U.S. Cl. .................... 429/340; 429/330; 429/231.8

(58) Field of Classification Search ..................... None
See application file for complete search history.

(56) References Cited

U.S. PATENT DOCUMENTS 4,528,254 A * 7/1985 Wolf et al. ................. 429/336
6,033,809 A * 3/2000 Hamamoto et al. ......... 429/340
2004/0091786 A1 * 5/2004 Unoki et al. ................ 429/327

FOREIGN PATENT DOCUMENTS

JP 2002-15768 1/2002

* cited by examiner

*Primary Examiner*—John S. Maples
(74) *Attorney, Agent, or Firm*—Wenderoth, Lind & Ponack, L.L.P.

(57) ABSTRACT

The present invention is characterized in that a nonaqueous electrolyte contains a sultone compound having unsaturated bonds, and the present invention thereby aims at suppressing the swelling of a nonaqueous electrolyte secondary battery, as represented by a lithium secondary battery, after being allowed to stand at a high temperature and at obtaining an excellent high temperature standing performance. Furthermore, by making the nonaqueous electrolyte contain, in addition to the sultone compound containing unsaturated bonds, a vinylene carbonate derivative in 1.0 wt % or below, and/or a cyclic sulfate in 2.0 wt % or below, there can be obtain a nonaqueous electrolyte secondary battery which prevents the initial discharge capacity degradation, occurring when the addition amount of the sultone compound having unsaturated bonds is increased, and has an excellent high temperature standing performance and a large initial discharge capacity.

28 Claims, 1 Drawing Sheet

NONAQUEOUS ELECTROLYTE SECONDARY BATTERY

BACKGROUND OF THE INVENTION

1. Field of the Invention

The present invention relates to a nonaqueous electrolyte secondary battery wherein the nonaqueous electrolyte contains a sultone compound having unsaturated bonds.

2. Description of the Prior Art

In these years, owing to the advance in electronic technology, there have been promoted the performance enhancement and miniaturization of electric appliances such as cellular telephones, notebook-type personal computers, video cameras, etc., and accordingly, there is a very strong demand for batteries of high energy density that can be used in these electric appliances. A representative battery that can meet such a demand is a lithium secondary battery in which lithium is used as a negative active material.

A lithium secondary battery comprises, for example, a negative plate comprising a current collector supporting a carbon material which absorbs and releases lithium ions, a positive plate comprising a current collector supporting a composite lithium oxide such as a lithium-cobalt composite oxide which absorbs and releases lithium ions, and a separator holding an electrolyte solution dissolving such lithium salts as $LiClO_4$, $LiPF_6$, etc. in an aprotic organic solvent and being interposed between the negative and positive plates to prevent short-circuiting of both plates.

The positive and negative plates are formed in thin sheets or foil shapes, and are piled or wound spirally through a intermediary of the separator to form an electric power generating element. The electric power generating element is housed in either a metallic can made of a stainless steel, a nickel plated iron, or lighter aluminum or a battery container made of laminate film, and subsequently an electrolyte is poured into the battery container, which is sealed for fabricating a battery.

Among a variety of characteristics to be generally demanded according to the use conditions, there are a set of high-temperature standing characteristics, which are particularly important characteristics for such a secondary battery as described above. The high temperature standing characteristics are assessed by measuring the swelling degree and the discharge capacity of the battery after the battery in a charged state has been allowed to stand for a specified duration in an environment where the temperature is 80° C. or above.

There are available many methods for improving the high temperature standing characteristics, among which are, for such a lithium secondary battery as described above, a method in which a solvent having a high boiling point and a low vapor pressure is used, and a method in which the decomposition of the nonaqueous electrolyte on the surfaces of the positive and negative plates is suppressed.

However, as in the former case, when a solvent having a high boiling point and a low vapor pressure is used, there occurs a problem that generally the viscosity of such a solvent is high and the electric conductivity of the nonaqueous electrolyte is lowered, and hence the discharge characteristics of the battery are lowered, etc. Accordingly, desirable is a method in which a small amount of an additive is added to the nonaqueous electrolyte in order not to degrade the electric conductivity of the nonaqueous electrolyte, and a satisfactory coating film is made to be formed on the positive or negative plate in order to kinetically stabilize the nonaqueous electrolyte.

Nowadays, nonaqueous batteries are more frequently adopted for use in a variety of electronic appliances not only in the atmospheric temperature environment but also in a variety of environments of from low to high temperatures. In particular, for example, a cellular telephone left in a sun-heated car makes the nonaqueous electrolyte secondary battery built therein be exposed to a high temperature environment. Thus, the characteristics in the high temperature environments of a nonaqueous electrolyte secondary battery becomes important among the characteristics thereof.

For example, a lithium secondary battery for use in a cellular telephone is required to be small in the swelling degree thereof when it is allowed to stand at 80° C. for a specified duration. However, when a conventional battery described above is left at a high temperature for a long period of time, the battery sometimes gets swollen owing to the gas generated inside the battery. In addition, in the late years, with increasing energy densities of a battery, a battery is demanded to be lighter and thinner, which constitutes a situation in which a battery tends to get more easily swollen.

As a measure to suppress the swelling of a battery when it is allowed to stand at a high temperature, there is a method in which a small amount of an additive is added to the nonaqueous electrolyte for the purpose of suppressing the decomposition of the nonaqueous electrolyte on the plates. For example, as Japanese Patent Laid-Open No. 2002-15768 discloses, there is known a method in which vinylene carbonate is added to the nonaqueous electrolyte of a nonaqueous electrolyte secondary battery. According to this method, it becomes possible to suppress the swelling of the battery when it is allowed to stand at a high temperature, while improving the discharge characteristics. However, even with such a method, the swelling of the battery cannot be suppressed sufficiently, and hence it is desirable to develop an additive having a further efficient suppressing effect.

SUMMARY OF THE INVENTION

The present invention attempts to obtain an excellent high temperature standing characteristics through suppressing the swelling of a nonaqueous electrolyte secondary battery as represented by a lithium secondary battery, when it is allowed to stand at a high temperature, by making an nonaqueous electrolyte to contain a sultone compound having unsaturated bonds.

By making the vinylene carbonate derivatives be contained in a concentration of 1.0 wt % or below, and/or a cyclic sulfate in a concentration of 2.0 wt % or below in the nonaqueous electrolyte, in addition to the sultone compound having unsaturated bonds, there is prevented the initial discharge capacity degradation occurring when the addition amount of the sultone compound having unsaturated bonds becomes large, so that there can be obtained a nonaqueous electrolyte secondary battery which has excellent high temperature standing characteristics and a large initial discharge capacity.

DETAILED DESCRIPTION OF EMBODIMENTS

Figure 1:
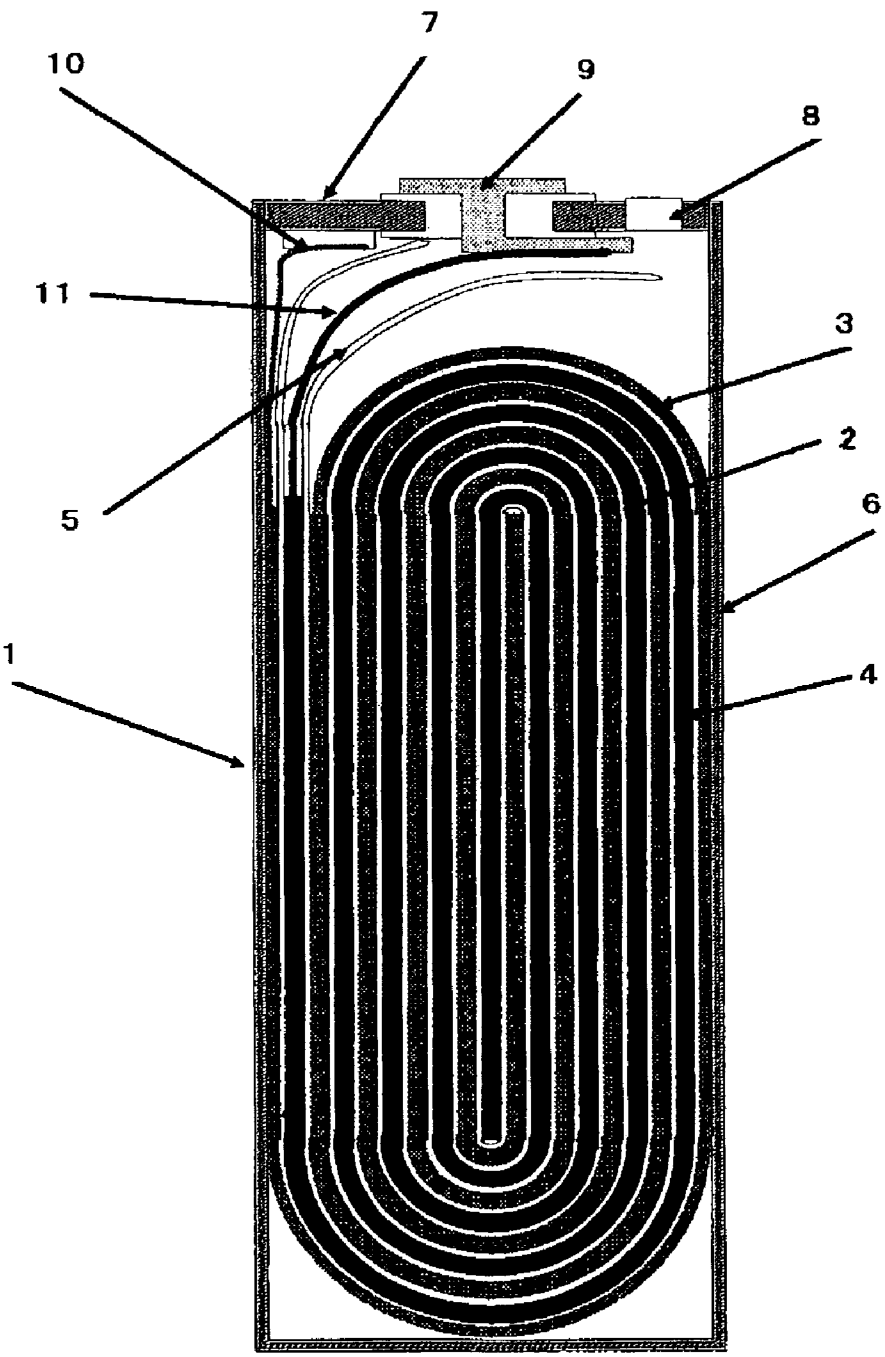
FIG. 1 is a figure illustrating one embodiment of the present invention which shows a sectional view of a prismatic nonaqueous electrolyte secondary battery.

The present invention is characterized in that in a non-aqueous electrolyte secondary battery, at least one sultone compound having unsaturated bonds is contained in the nonaqueous electrolyte.

The sultone compound having unsaturated bonds is the compound represented by chemical formula (1), where R1 to R4 are independently hydrogen, or the same or different types of alkyl groups, alkoxy groups, halogens, haloalkyl groups, or aryl groups (any group may have unsaturated bonds). Specific examples include 1,3-(1-propene)sultone, 1,3-(1-butene)sultone, 1,3-(2-methyl-1-propene)sultone, 2,4-(2-butene)sultone, etc.

(Chemical formula 1)

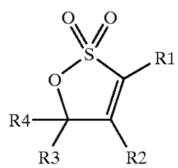

The formula represents a compound in which R1 to R4 are independently hydrogen, or the same or different types of alkyl groups, alkoxy groups, halogens, haloalkyl groups, or aryl groups.

According to the present invention, by using a sultone compound having unsaturated bonds, the high temperature standing characteristics can be improved. The reasons for that is not yet clear, but it is inferred that the sultone compound having unsaturated bonds forms a satisfactory solid electrolyte interface (SEI) on the surface of the negative active material, and thereby suppress the gas generation caused by the reductive decomposition of the nonaqueous solvent on surface of the negative plate.

The content of the sultone having unsaturated bonds in the nonaqueous electrolyte is preferably 0.2 wt % or above and 2 wt % or below. When the sultone compound having unsaturated bonds is used alone, the content thereof is preferably 0.5 wt % or above and 1 wt % or below. With increasing content of the sultone compound having unsaturated bonds, there is increased the degree of suppression of the swelling of a battery after being allowed to stand at a high temperature, and the suppression effect can be recognized when the content reaches 0.2 wt %. However, with increasing content of the sulfone compound, the initial discharge capacity tends to be decreased, and it is unpreferable that the content exceeds 2 wt %, since the initial discharge capacity is significantly decreased.

The present invention is also characterized in that the nonaqueous electrolyte contains a vinylene carbonate derivative in 1.0 wt % or below and/or a cyclic sulfate in 2.0 wt % or below, in addition to the sultone compound having unsaturated bonds.

The vinylene carbonate derivative and cyclic sulfate are respectively the compounds represented by chemical formula (2) and chemical formula (3), where R5 to R12 are independently hydrogen, or the same or different types of alkyl groups, alkoxy groups, halogens, haloalkyl groups, or aryl groups (any group may contain unsaturated bonds).

(Chemical formula 2)

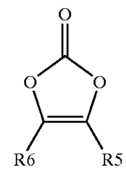

The formula represents a compound in which R5 to R6 are independently hydrogen, or the same or different types of alkyl groups, alkoxy groups, halogens, haloalkyl groups, or aryl groups.

(Chemical formula 3)

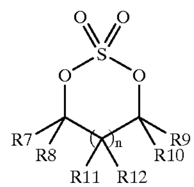

(Here, n is 0 or 1.)

The formula represents a compound in which R7 to R12 are independently hydrogen, or the same or different types of alkyl groups, alkoxy groups, halogens, haloalkyl groups, or aryl groups.

Examples of the vinylene carbonate derivatives represented by chemical formula (2) include vinylene carbonate, 4,5-dimethylvinylene carbonate, 4,5-diethylvinylene carbonate, 4,5-dipropylvinylene carbonate, 4-ethyl-5-methylvinylene carbonate, 4-ethyl-5-propylvinylene carbonate, etc.

Examples of the cyclic sulfate represented by chemical formula (3) include ethylene glycol sulfate, 1,2-propanediol sulfate, 1,2-butanediol sulfate, 1,3-butanediol sulfate, 2,3-butanediol sulfate, phenylethylene glycol sulfate, etc.

The degradation of the initial discharge capacity caused by the addition of the sultone compound having unsaturated bonds can be suppressed by making the nonaqueous electrolyte contain the sultone compound having unsaturated bonds, a vinylene carbonate derivative, and/or a cyclic sulfate.

The reasons for that is not yet clear, but it is inferred that the vinylene carbonate derivative or the cyclic sulfate forms an satisfactory SET on the surface of the negative plate, and thereby suppress the formation of the negative plate surface coating film, relatively low in the lithium ion conductivity, by the sultone compound having unsaturated bonds.

The content of a vinylene carbonate derivative in the nonaqueous electrolyte is preferably 0.1 wt % or above and 1.0 wt % or below, irrespective of whether a cyclic sulfate is contained or not. With increasing content of the vinylene derivative, there can be recovered the initial discharge capacity decreased with the addition of the sultone compound having unsaturated bonds. The recovering effect can be recognized with the content of the vinylene carbonate as very small as 0.1 wt %. However, when the content of the vinylene derivative exceeds 1 wt %, a relatively high resistance coating film is formed on the negative plate, and the vinylene carbonate persisting in the nonaqueous electrolyte, without being decomposed on the negative plate in the first discharging and charging, is decomposed to generate the gas. Therewith, the recovery of the initial discharge capacity is slowed down, and on the other hand, the swelling of the battery becomes remarkable.

The content of the cyclic sulfate in the nonaqueous electrolyte is preferably 0.1 wt % or above and 2 wt % or below, and it is preferably 0.1 wt % or above and 2.0 wt % or below even when the cyclic sulfate is added together with the vinylene carbonate derivative. Similarly to the case of the addition of the vinylene carbonate derivative, in the addition of the cyclic sulfate, with increasing content of the sulfate in the nonaqueous electrolyte, there can be recovered the initial discharge capacity decreased with the addition of the sultone compound having unsaturated bonds. The recovering effect can be recognized with the content of the cyclic sulfate as very small as 0.1 wt %. However, when the content of the cyclic sulfate exceeds the above described upper limit, on the contrary, the initial discharge capacity is decreased, and the swelling of the battery becomes remarkable.

As the nonaqueous electrolyte, either an electrolyte solution or a solid electrolyte can be used. When an electrolyte solution is used, as the solvent for the electrolyte solution, the following polar solvents and the mixtures thereof can be used: ethylene carbonate, prolpylene carbonate, dimethyl carbonate, ethyl methyl carbonate, diethyl carbonate, γ-butyrolactone, sulfolane, dimethyl sulfoxide, acetonitrile, dimethyl formamide, dimethyl acetamide, 1,2-dimethoxyethane, 1,2-diethoxyethane, tetrahydrofuran, 2-methyltetrahydorfuran, dioxolane, methyl acetate, etc. It is preferable that the solvent to be used for the electrolyte solution contains ethylene carbonate, among these solvents, in order to improve the discharge characteristics and life characteristics of a battery.

The electrolyte salts to be dissolved in the solvent of the electrolyte solution are the following salts and the mixtures thereof: $LiPF_6$, $LiClO_4$, $LiBF_4$, $LiAsF_6$, $LiCF_3CO_2$, $LiCF_3(CF_3)_3$, $LiCF_3(C_2F_5)_3$, $LiCF_3SO_3$, $LiN(SO_2CF_3)_2$, $LiN(SO_2CF_2CF_3)_2$, $LiN(COCF_3)_2$, $LiN(COCF_2CF_3)_2$, and $LiPF_3(CF_2CF_3)_3$. In order to improve the discharge and cycle life characteristics through formation of a satisfactory coating film on the negative plate, it is preferable that among these electrolyte salts, the electrolyte salts to be added to the electrolyte solution partially contain $LiPF_6$ and $LiBF_4$.

As a positive active material, there can be used the composite oxides represented by the composition formulas $Li_xMO_2$, $Li_yM_2O_4$, and $Na_xMO_2$ (M stands for one or more than one types of transition metals, $0 \leqq x \leqq 1$, $0<y<2$) and a metal chalcogenide or a metal oxide which has either a tunnel structure or a layer structure. Specific examples include $LiCoO_2$, $LiCo_xNi_{1-x}O_2$, $LiMn_2O_4$, $Li_2Mn_2O_4$, $MnO_2$, $FeO_2$, $V_2O_5$, $V_6O_{13}$, $TiO_2$, $TiS_2$, etc. In this connection, as for organic compounds, a conducting polymer such as polyaniline can be used. Any mixture of the above described active materials, irrespective of whether inorganic or organic, may be used.

As a negative active material, there may be used the alloys of Li with Al, Si, Pb, Sn, Zn, Cd, etc., metal oxides such as $LiFe_2O_3$, $WO_2$, $MoO_2$, SiO, and CuO, carbon materials such as graphite, and carbon, lithiumnitrides such as $Li_5(Li_3N)$, ormetalliclithium, orthemixtures thereof. However, in consideration of the cycle life characteristics and the safety of the battery, it is preferable to use carbon materials.

As a separator of a nonaqueous electrolyte battery related to the present invention, there can be used woven cloth, nonwoven cloth, microporous synthetic resin film, etc., and particularly microporous synthetic resin film can be used suitably. Among these, the microporous films made of polyethylene and polypropylene, and the polyolefin-based microporous films such as the microporous films derived from combination thereof are used suitably in view of the film thickness, film strength, and film resistance, etc.

Solid electrolytes such as polymer solid electrolytes, which work simultaneously as separators, can be used. In this case, a porous polymer solid electrolyte film is used as the polymer solid electrolyte, and the solid electrolyte film can be made to contain an electrolyte solution.

When a gelled polymer solid electrolyte is used, the electrolyte solution composing the gel and the electrolyte solution contained in the pores may be different from each other. When such a polymer solid electrolyte is used, the electrolyte solution can contain the sultone compounds having unsaturated bonds, vinylene carbonate derivatives, or cyclic sulfates of the present invention. Furthermore, synthetic resin microporous films and polymer solid electrolytes etc. may be used in combination.

Without any particular restriction to the battery shape, the present invention can be applied to such a various shapes of nonaqueous electrolyte secondary batteries as prismatic, elliptical, coin-shaped, button-shaped, sheet-shaped batteries, etc. The present invention intends to suppress the swelling of a battery when the battery is allowed to stand at a high temperature, and accordingly the present invention provides remarkable effects when battery cases are weak in mechanical strength, and in particular, battery cases made of aluminum or aluminum laminate are used.

EXAMPLES

Description will be made below on the embodiments of the present invention on the basis of the specific examples. However, the present invention is not limited by the examples, and the proper modifications and variations in the embodiments can be made within the spirit and scope of the present invention.

Examples and Comparative Examples

Fabrication of Batteries

FIG. 1 is a figure outlining a sectional view of a prismatic nonaqueous electrolyte secondary battery of the present embodiment.

The prismatic nonaqueous electrolyte secondary battery 1 comprises a group of flat and wound plates 2 and a nonaqueous electrolyte, both housed in a battery case 6. The dimension of the battery is 30 mm in width×48 mm in height×4 mm in thickness. The group of plates is fabricated by winding together spirally a positive plate 3 made of an aluminum current collector coated with a positive active material and a negative plate 4 made of a copper current collector coated with a negative active material, through a intermediary of the separator 5.

A battery cap 7 equipped with a safety valve 8 is fixed to a battery case 6 by laser welding, a negative plate terminal 9 is connected to a negative plate 4 via a lead wire for the negative plate 11, and a positive plate 3 is connected to the battery cap via a lead wire for the positive plate 10.

The positive plate was formed as follows: A positive composite was prepared by mixing polyfluorovinylidene (8 wt %) as a binder, acetylene black (5 wt %) as a conducting material, and a lithium cobalt composite oxide (87 wt %) as a positive active material. N-methylpyrrolidone was added to the positive composite to prepare a pasty positive composite. The pasty positive composite was applied onto both sides of an aluminum foil current collector of 20 μm in thickness and the coated layers were dried.

A negative plate was formed as follows: A pasty composite was prepared from graphite (95 wt %), carboxymethyl cellulose (2 wt %), styrene-butadiene rubber (3 wt %), and an appropriate amount of water. The pasty composite was applied onto both sides of a copper foil current collector of 15 μm in thickness, and the coated layers were dried.

A sheet of polyethylene microporous film was used as a separator.

The nonaqueous electrolytes were prepared as follows: The lithium salt $LiPF_6$ was dissolved in a concentration of 1 mol/l in a mixed solvent of ethylene carbonate and ethyl methyl carbonate (4:6 in volume ratio). To this solution as base, 1,3-(1-propene) sultone represented by chemical formula (4) was added in the range from 0.2 to 2.0 wt % in relation to the total amount of the electrolyte, vinylene carbonate represented by chemical formula (5) was added in the range from 0.1 to 2.0 wt %, and ethylene glycol sulfate represented by chemical formula (6) was added in the range from 0.1 to 4.0 wt %, thus obtaining various electrolytes.

(Chemical formula 4)

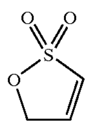

(Chemical formula 5)

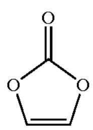

(Chemical formula 6)

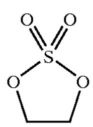

Table 1 collects the contents of 1,3-(1-propene)sultone, vinylene carbonate, and ethylene glycol sulfate in the nonaqueous electrolytes used in the batteries of Examples 1 to 41 and Comparative Examples 1 to 3.

TABLE 1

| | Additives | | | Initial | Battery thickness after being allowed to stand at a high |
|---|---|---|---|---|---|
| | 1,3-(1-Propene) sultone | Vinylene carbonate | Ethylene glycol sulfate | discharge capacity (mAh) | temperature (mm) |
| Example 1 | 0.2 | No | No | 608 | 4.68 |
| Example 2 | 0.2 | 0.1 | No | 610 | 4.67 |
| Example 3 | 0.2 | 0.5 | No | 614 | 4.69 |
| Example 4 | 0.2 | 1.0 | No | 615 | 4.68 |
| Example 5 | 0.2 | 2.0 | No | 615 | 4.98 |
| Example 6 | 0.2 | No | 0.1 | 612 | 4.65 |
| Example 7 | 0.2 | No | 0.5 | 614 | 4.63 |
| Example 8 | 0.2 | No | 1.0 | 613 | 4.65 |
| Example 9 | 0.2 | No | 2.0 | 612 | 4.67 |

TABLE 1-continued

| | Additives | | | Initial | Battery thickness after being allowed to stand at a high |
|---|---|---|---|---|---|
| | 1,3-(1-Propene) sultone | Vinylene carbonate | Ethylene glycol sulfate | discharge capacity (mAh) | temperature (mm) |
| Example 10 | 0.2 | No | 4.0 | 611 | 4.94 |
| Example 11 | 0.5 | No | No | 606 | 4.51 |
| Example 12 | 0.5 | 0.1 | No | 608 | 4.50 |
| Example 13 | 0.5 | 0.5 | No | 612 | 4.49 |
| Example 14 | 0.5 | 1.0 | No | 614 | 4.51 |
| Example 15 | 0.5 | 2.0 | No | 615 | 4.91 |
| Example 16 | 0.5 | No | 0.1 | 610 | 4.48 |
| Example 17 | 0.5 | No | 0.5 | 612 | 4.47 |
| Example 18 | 0.5 | No | 1.0 | 611 | 4.46 |
| Example 19 | 0.5 | No | 2.0 | 610 | 4.48 |
| Example 20 | 0.5 | No | 4.0 | 610 | 4.89 |
| Example 21 | 1.0 | No | No | 601 | 4.39 |
| Example 22 | 1.0 | 0.1 | No | 603 | 4.37 |
| Example 23 | 1.0 | 0.5 | No | 608 | 4.35 |
| Example 24 | 1.0 | 1.0 | No | 610 | 4.40 |
| Example 25 | 1.0 | 2.0 | No | 611 | 4.90 |
| Example 26 | 1.0 | No | 0.1 | 604 | 4.35 |
| Example 27 | 1.0 | No | 0.5 | 608 | 4.38 |
| Example 28 | 1.0 | No | 1.0 | 610 | 4.36 |
| Example 29 | 1.0 | No | 2.0 | 610 | 4.39 |
| Example 30 | 1.0 | No | 4.0 | 609 | 4.88 |
| Example 31 | 2.0 | No | No | 580 | 4.31 |
| Example 32 | 2.0 | 0.1 | No | 588 | 4.32 |
| Example 33 | 2.0 | 0.5 | No | 605 | 4.30 |
| Example 34 | 2.0 | 1.0 | No | 610 | 4.31 |
| Example 35 | 2.0 | 2.0 | No | 611 | 4.88 |
| Example 36 | 2.0 | No | 0.1 | 586 | 4.30 |
| Example 37 | 2.0 | No | 0.5 | 593 | 4.28 |
| Example 38 | 2.0 | No | 1.0 | 605 | 4.28 |
| Example 39 | 2.0 | No | 2.0 | 609 | 4.32 |
| Example 40 | 2.0 | No | 4.0 | 608 | 4.86 |
| Example 41 | 2.0 | 1.0 | 2.0 | 609 | 4.34 |
| Comparative Example 1 | No | No | No | 610 | 4.83 |
| Comparative Example 2 | No | 1.0 | No | 615 | 4.80 |
| Comparative Example 3 | No | No | 2.0 | 612 | 4.81 |

[Initial Discharge Capacity Test and Measurement Method for the Battery Thickness after Being Allowed to Stand at a High Temperature]

The initial capacity and battery thickness measurements we remade for the prismatic nonaqueous electrolyte secondary batteries of Examples and Comparative Examples fabricated as described above.

The initial capacity is the discharge capacity measured as follows: a battery is charged for 2.5 hours under the constant current-constant voltage charging conditions wherein the charge current is 600 mA and the charge voltage is 4.20 V, and subsequently the discharge capacity is measured under the discharge conditions where the discharge current is 600 mA and the cut-off voltage is 2.75 V.

The battery thickness measurement after being allowed to stand at a high temperature is the battery thickness measured as follows: a battery which has been subjected to the initial capacity examination is charged for 2.5 hours under the constant current-constant voltage charging conditions where the current is 600 mA and the voltage is 4.20 V; subsequently the battery is allowed to stand at 80° C. for 50 hours;

and then the battery is cooled down to room temperature and the battery thickness is measured.

[Results of the Initial Discharge Capacity Test and Measurement for the Battery Thickness after Being Allowed to Stand at a High Temperature]

Table 1 collects the test and measurement results for the batteries of Examples and Comparative Examples, together with the additive contents. For each test and measurement, the listed value is the average value over the values obtained for ten batteries.

From the results listed in Table 1, it has been found that the battery thicknesses after being allowed to stand at a high temperature are smaller and the battery swelling is more suppressed in the batteries in Example 1, Example 11, Example 21, and Example 31 in which 1,3-(1-propene) sultone was added alone as compared to the battery of Comparative Example 1 in which 1,3-(1-propene) sultone was not added.

As can be seen from the above results, although the initial discharge capacity is decreased with increasing addition amount of 1,3-(1-propene)sultone, when vinylene carbonate is further added, as can be seen from the results for the batteries of Examples 2 to 4, Examples 12 to 14, Examples 22 to 24, and Examples 32 to 34, the initial discharge capacity degradation caused by the addition of 1,3-(1-propene) sultone is able to be suppressed, the initial discharge capacity becomes larger, and the swelling after being allowed to stand at a high temperature becomes smaller.

However, as can be seen from the results for the batteries of Example 5, Example 15, Example 25, and Example 35, when the amount of vinylene carbonate added to the nonaqueous electrolyte is 2 wt %, the battery thickness after being allowed to stand at a high temperature becomes larger, despite the addition of 1,3-(1-propene)sultone.

In addition, as can be seen from the results for the batteries of Examples 6 to 9, Examples 16 to 19, Examples 26 to 29, and Examples 36 to 39, when ethylene glycol sulfate-is added in addition to 1,3-(1-propene) sultone, the initial discharge capacity degradation due to the increase in addition amount of 1,3-(1-propene)sultone is suppressed, the initial discharge capacity becomes larger, and the battery swelling after being allowed to stand at a high temperature becomes smaller.

However, as can be seen from the results for the cases of Example 10, Example 20, Example 30, and Example 40, when the amount of ethylene glycol sulfate added to the nonaqueous electrolyte is 4 wt %, the battery thickness after being allowed to stand at a high temperature becomes larger, despite the addition of 1,3-(1-propene)sultone.

To sum up, by addition of 1,3-(1-propene)sultone to the nonaqueous electrolyte, the battery swelling after being allowed to stand at a high temperature is able to be made small. When the addition amount of 1,3-(1-propene)sultone is large, the initial discharge capacity is decreased, but the initial discharge capacity degradation is able to be suppressed by the addition of vinylene carbonate in 1.0 wt % or below in addition to 1,3-(1-propene) sultone. The initial discharge capacity degradation is also able to be suppressed by the addition of ethylene glycol sulfate in 2.0 wt % or below in addition to 1,3-(1-propene)sulfone.

From the results obtained for Comparative Example 2 and Comparative Example 3, it has been found that the effect suppressing the battery swelling due to being allowed to stand at a high temperature is not sufficient when either vinylene carbonate or ethylene glycol sulfate is added alone, and the swelling suppression effect is mainly ascribable to 1,3-(1-propene)sulfone.

As can be seen from the results of Example 41, it has been found that there can also be obtained a battery in which the battery swelling caused by being allowed to stand at a high temperature is small and the discharge capacity is large, when vinylene carbonate (1.0 wt %) and ethylene glycol sulfate (2.0 wt %) are added in addition to 1,3-(1-propene) sultone (2.0 wt %).

In Examples described above, the solvents used are ethylene carbonate and ethyl methyl carbonate. Results similar to those in Example 41 can also be obtained when dimethyl carbonate, diethyl carbonate, γ-butyrolactone, and propylene carbonate are used in place of ethyl methyl carbonate, or when the concentration of $LiPF_6$ as solute is varied or the type of the solute is varied. Thus, the solvent and solute composing the nonaqueous electrolyte should not be limited to those combinations which are used in Examples.

As for Examples described above, description is made on the cases where 1,3-(1-propene) sultone is used as the sultone compound having unsaturated bonds. Effects similar to those obtained with 1,3-(1-propene)sultone can also be obtained with 1,3-(1-butene)sultone, 1,3-(2-methyl-1-propene)sultone, and 2,4-(2-butene)sultone.

The above descriptions on Examples include the examples wherein vinylene carbonate and/or ethylene glycol sulfate is added in addition to 1,3-(1-propene)sultone. Effects similar to those obtained with vinylene carbonate and/or ethylene glycol sulfate can be obtained when in place of vinylene carbonate, there are used the vinylene carbonate derivatives represented by chemical formula (2), such as 4,5-dimethylvinylene carbonate, 4,5-diethylvinylene carbonate, 4,5-dipropylvinylene carbonate, 4-ethyl-5-methylvinylene carbonate, 4-ethyl-5-propylvinylene carbonate.

In addition, effects similar to those obtained with vinylene carbonate and/or ethylene glycol sulfate can be obtained when in place of ethylene glycol sulfate, there are used the cyclic sulfates represented by chemical formula (3) such as 1,2-propanediol sulfate, 1,2-butanediolo sulfate, 1,3-butanediol sulfate, 2,3-butanediol sulfate, and phenylethylene glycol sulfate.

Furthermore, the substituent groups in the sultone compounds having unsaturated bonds (chemical formula (1)), the vinylene carbonate derivatives (chemical formula (2)), and the cyclic sulfates (chemical formula (3)) are not restricted to hydrogen, but may be alkyl, alkoxy, halogen, haloalkyl, or aryl (unsaturated bonds may be contained in any group). It may be noted that the number of moles of a compound having a larger molecular weight becomes smaller for a certain addition amount. In order to prevent the cost rise and the adverse effects on the battery characteristics, etc., substituents of lower molecular weights are desirable.

Furthermore, the positive and negative active materials are not limited to the combinations mentioned in the above descriptions of Examples, but the various active materials mentioned in the above descriptions of Embodiments can be used.

The invention claimed is:

1. A nonaqueous electrolyte secondary battery comprising the following elements:

a positive plate;

a negative plate;

a separator interposed between said positive plate and said negative plate; and a nonaqueous electrolyte containing at least a sultone compound having unsaturated bonds represented by chemical formula (1):

(Chemical formula 1)

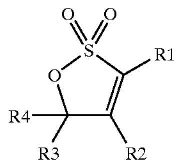

where R1 to R4 are independently selected from the group consisting of hydrogen, alkyl, alkoxy, halogen, haloalkyl, and aryl.

2. The nonaqueous electrolyte secondary battery according to claim 1 wherein the concentration of said sultone compound having unsaturated bonds in said nonaqueous electrolyte is 2 wt % or below.

3. The nonaqueous electrolyte secondary battery according to claim 1 wherein the concentration of said sultone compound having unsaturated bonds in said nonaqueous electrolyte is 0.2 wt % or above.

4. The nonaqueous electrolyte secondary battery according to claim 1 wherein said sultone compound having unsaturated bonds is 1,3-(1-propene)sultone.

5. The nonaqueous electrolyte secondary battery according to claim 1 wherein said negative plate comprises a carbon material as a negative active material.

6. The nonaqueous electrolyte secondary battery according to claim 1 wherein said nonaqueous electrolyte contains ethylene carbonate.

7. A nonaqueous electrolyte secondary battery comprising the following elements:

a positive plate;

a negative plate;

a separator interposed between said positive plate and said negative plate; and a nonaqueous electrolyte containing at least a sultone compound having unsaturated bonds represented by chemical formula (1), and furthermore, a vinylene carbonate derivative represented by chemical formula (2) in 1 wt % or below, and a cyclic sulfate represented by chemical formula (3) in 2 wt % or below:

(Chemical formula 1)

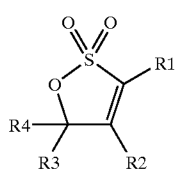

where R1 to R4 are independently selected from the group consisting of hydrogen, alkyl, alkoxy, halogen, haloalkyl, and aryl;

(Chemical formula 2)

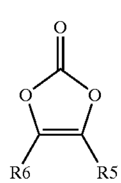

where R5 and R6 are independently selected from the group consisting of hydrogen, alkyl, alkoxy, halogen, haloalkyl, and aryl; and (Chemical formula 3)

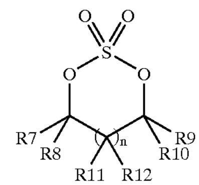

where R7 to R12 are independently selected from the group consisting of hydrogen, alkyl, alkoxy, halogen, haloalkyl, and aryl, and n is 0 or 1.

8. The nonaqueous electrolyte secondary battery according to claim 7 wherein the concentration of said sultone compound having unsaturated bonds in said nonaqueous electrolyte is 2 wt % or below.

9. The nonaqueous electrolyte secondary battery according to claim 7 wherein the concentration of said sultone compound having unsaturated bonds in said nonaqueous electrolyte is 0.2 wt % or above.

10. The nonaqueous electrolyte secondary battery according to claim 7 wherein said nonaqueous electrolyte contains said vinylene carbonate derivative in 0.1 wt % or above.

11. The nonaqueous electrolyte secondary battery according to claim 7 wherein said nonaqueous electrolyte contains said cyclic sulfate in 0.1 wt % or above.

12. The nonaqueous electrolyte secondary battery according to claim 7 wherein said sultone compound having unsaturated bonds is 1,3-(1-propene)sultone.

13. The nonaqueous electrolyte secondary battery according to claim 7 wherein said negative plate comprises a carbon material as a negative active material.

14. The nonaqueous electrolyte secondary battery according to claim 7 wherein said nonaqueous electrolyte contains ethylene carbonate.

15. A nonaqueous electrolyte secondary battery comprising the following elements:

a positive plate;

a negative plate;

a separator interposed between said positive plate and said negative plate; and a nonaqueous electrolyte containing at least a sultone compound having unsaturated bonds represented by chemical formula (1), and a vinylene carbonate derivative represented by chemical formula (2) in 0.1 wt % to 1 wt %:

(Chemical formula 1)

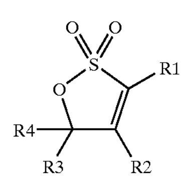

where R1 to R4 are independently selected from the group consisting of hydrogen, alkyl, alkoxy, halogen, haloalkyl, and aryl; and (Chemical formula 2)

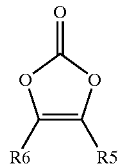

where R5 and R6 are independently selected from the group consisting of hydrogen, alkyl, alkoxy, halogen, haloalkyl, and aryl.

16. The nonaqueous electrolyte secondary battery according to claim 15 wherein the concentration of said sultone compound having unsaturated bonds in said nonaqueous electrolyte is 2 wt % or below.

17. The nonaqueous electrolyte secondary battery according to claim 15 wherein the concentration of said sultone compound having unsaturated bonds in said nonaqueous electrolyte is 0.2 wt % or above.

18. The nonaqueous electrolyte secondary battery according to claim 15 wherein said nonaqueous electrolyte contains cyclic sulfate in 0.1 wt % to 2 wt %.

19. The nonaqueous electrolyte secondary battery according to claim 15 wherein said sultone compound having unsaturated bonds is 1,3-(1-propene)sultone.

20. The nonaqueous electrolyte secondary battery according to claim 15 wherein said negative plate comprises a carbon material as a negative active material.

21. The nonaqueous electrolyte secondary battery according to claim 15 wherein said nonaqueous electrolyte contains ethylene carbonate.

22. A nonaqueous electrolyte secondary battery comprising the following elements:

a positive plate;

a negative plate;

a separator interposed between said positive plate and said negative plate; and a nonaqueous electrolyte containing at least a sultone compound having unsaturated bonds represented by chemical formula (1), and a cyclic sulfate represented by chemical formula (3) in 0.1 wt % to 2 wt %:

(Chemical formula 1)

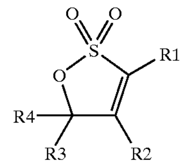

where R1 to R4 are independently selected from the group consisting of hydrogen, alkyl, alkoxy, halogen, haloalkyl, and aryl; and (Chemical formula 3)

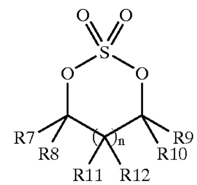

where R7 to R12 are independently selected from the group consisting of hydrogen, alkyl, alkoxy, halogen, haloalkyl, and aryl, and n is 0 or 1.

23. The nonaqueous electrolyte secondary battery according to claim 22 wherein the concentration of said sultone compound having unsaturated bonds in said nonaqueous electrolyte is 2 wt % or below.

24. The nonaqueous electrolyte secondary battery according to claim 22 wherein the concentration of said sultone compound having unsaturated bonds in said nonaqueous electrolyte is 0.2 wt % or above.

25. The nonaqueous electrolyte secondary battery according to claim 22 wherein said nonaqueous electrolyte contains vinylene carbonate derivative in 0.1 wt % to 1 wt %.

26. The nonaqueous electrolyte secondary battery according to claim 22 wherein said sultone compound having unsaturated bonds is 1,3-(1-propene)sultone.

27. The nonaqueous electrolyte secondary battery according to claim 22 wherein said negative plate comprises a carbon material as a negative active material.

28. The nonaqueous electrolyte secondary battery according to claim 22 wherein said nonaqueous electrolyte contains ethylene carbonate.

* * * * *